(12) United States Patent
Balestier et al.

(10) Patent No.: US 8,935,978 B2
(45) Date of Patent: Jan. 20, 2015

(54) MIXING, HEATING AND/OR WHIPPING DEVICE FOR PREPARING HOT BEVERAGES

(75) Inventors: Diego Balestier, Trieste (IT); Riccardo De Luca, Doberdo' del Lago (IT)

(73) Assignee: Illycaffe' S.p.A. (IT)

( * ) Notice: Subject to any disclaimer, the term of this patent is extended or adjusted under 35 U.S.C. 154(b) by 83 days.

(21) Appl. No.: 13/201,706

(22) PCT Filed: Jan. 26, 2010

(86) PCT No.: PCT/EP2010/050877
§ 371 (c)(1),
(2), (4) Date: Aug. 16, 2011

(87) PCT Pub. No.: WO2010/091948
PCT Pub. Date: Aug. 19, 2010

(65) Prior Publication Data
US 2011/0297007 A1 Dec. 8, 2011

(30) Foreign Application Priority Data

Feb. 16, 2009 (IT) .............................. MI2009A0199

(51) Int. Cl.
*A23F 3/00* (2006.01)
*A47J 31/44* (2006.01)
(52) U.S. Cl.
CPC .......... *A47J 31/4489* (2013.01); *A47J 31/4485* (2013.01)
USPC ........................................... 99/323.1; 99/293
(58) Field of Classification Search
CPC ............................. A47J 31/4485; A47J 31/46
USPC ......... 99/293, 323.1; 261/77, 121.1; 426/333, 426/474, 594
See application file for complete search history.

(56) References Cited

U.S. PATENT DOCUMENTS 4,735,133 A * 4/1988 Paoletti ........................... 99/452
4,949,631 A * 8/1990 Fregnan ........................... 99/452
(Continued)

FOREIGN PATENT DOCUMENTS

DE 20218746 U1 3/2003
DE 102004025037 A1 12/2005
(Continued)

OTHER PUBLICATIONS

International Search Report and Written Opinion issued Apr. 21, 2010 issued by European Patent Office; re: PCT/EP2010/050877; citing US 2008/053314 A1, DE 10 2004 025037 A1, DE 202 18 746 U1, EP 0 575 762 A and WO 2005/074770 A.
(Continued)

*Primary Examiner* — Dana Ross
*Assistant Examiner* — Brandon Harvey
(74) *Attorney, Agent, or Firm* — Cantor Colburn LLP

(57) ABSTRACT

A frothing device including a central body which is detachably associable with a steam delivery tube and an outer casing which fits over the central body. The central body forms channels for the passage of air and of liquid to be frothed, in order to mix them with the steam and consequently mix the three flows. The device further includes a first mixing region for forming a mixture composed of the air and the liquid to be frothed, which arrive respectively from an air intake channel and a liquid rising channel, which are formed by the central body and by the outer casing, the formed mixture then converges in a second mixing region with the steam that is injected in the second mixing region and arrives from the delivery tube and then enters the beverage by means of a discharge channel that extends from the second mixing region.

12 Claims, 4 Drawing Sheets

(56) References Cited

U.S. PATENT DOCUMENTS

| | | | |
|---|---|---|---|
| 5,335,588 A | | 8/1994 | Mahlich |
| 6,644,177 B1 * | | 11/2003 | Hsu .................................. 99/453 |
| 6,786,138 B2 * | | 9/2004 | Johnson et al. .............. 99/323.1 |
| 2004/0231528 A1 | | 11/2004 | Paoletti |
| 2008/0053314 A1 * | | 3/2008 | De' Longhi .................... 99/293 |

FOREIGN PATENT DOCUMENTS

| | | | |
|---|---|---|---|
| EP | 0575762 | A1 | 12/1993 |
| WO | 2005/074770 | A1 | 8/2005 |

OTHER PUBLICATIONS

Italian Search Report and Written Opinion dated Nov. 16, 2009 re: IT MI20090199; citing US 2008/053314 A1, DE 10 2004 025037 A1; DE 202 18 746 U1, E 0 575 762 A and WO 2005/074770 A.

Japanese Examination Report issued Oct. 15, 2013; regarding Japanese Application No. 2011-549505; citing: US 2004/0231528 A1 and US 2008/0053314 A1.

* cited by examiner

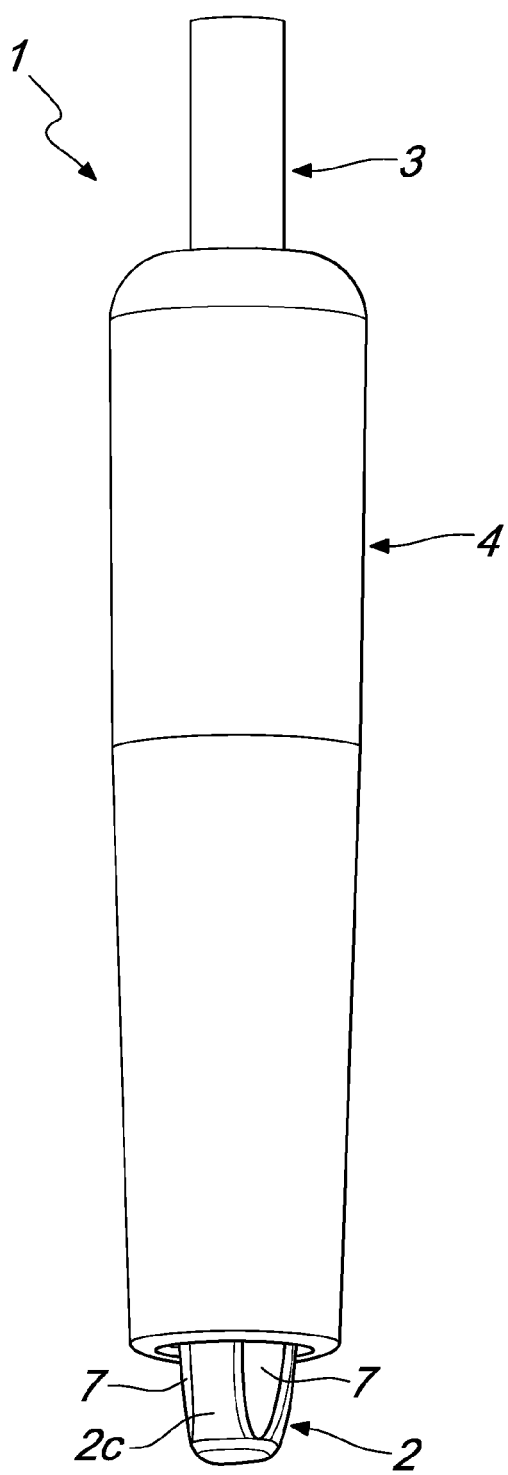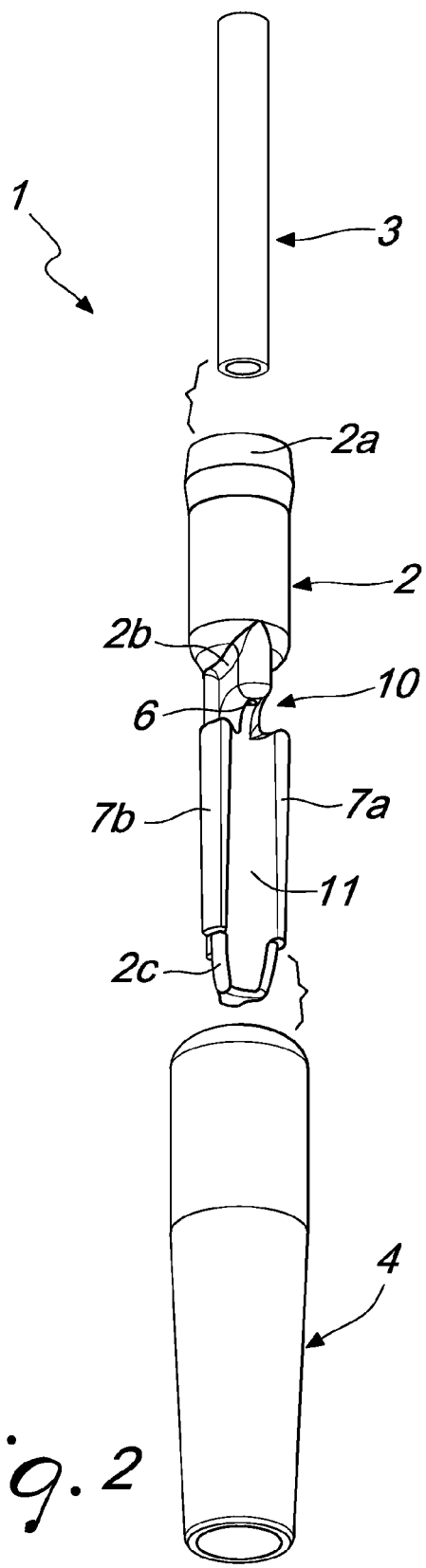
Fig.1
Fig.2

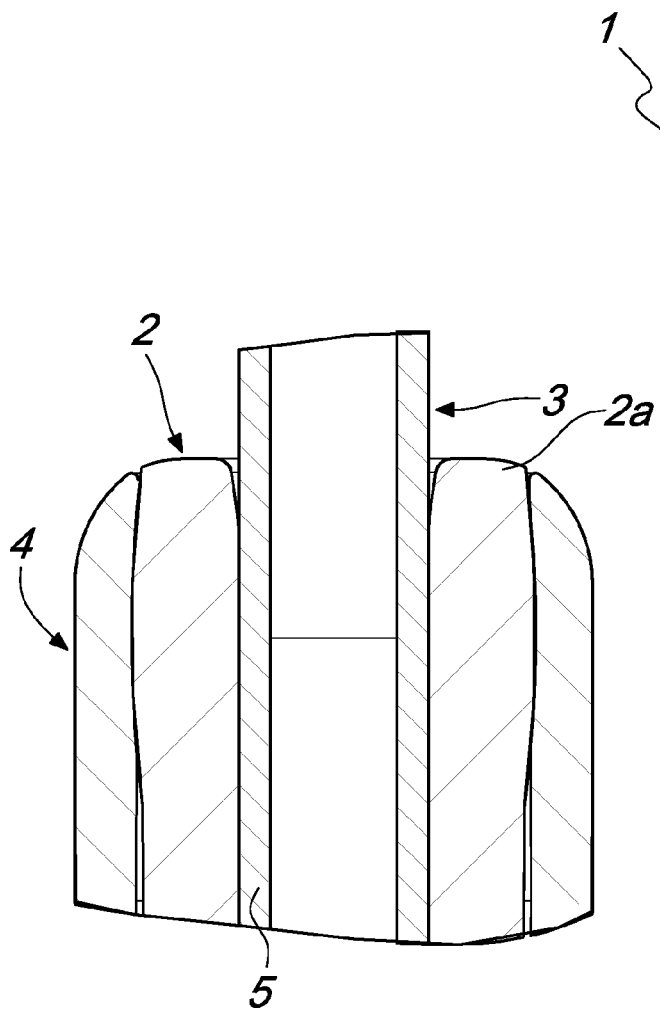
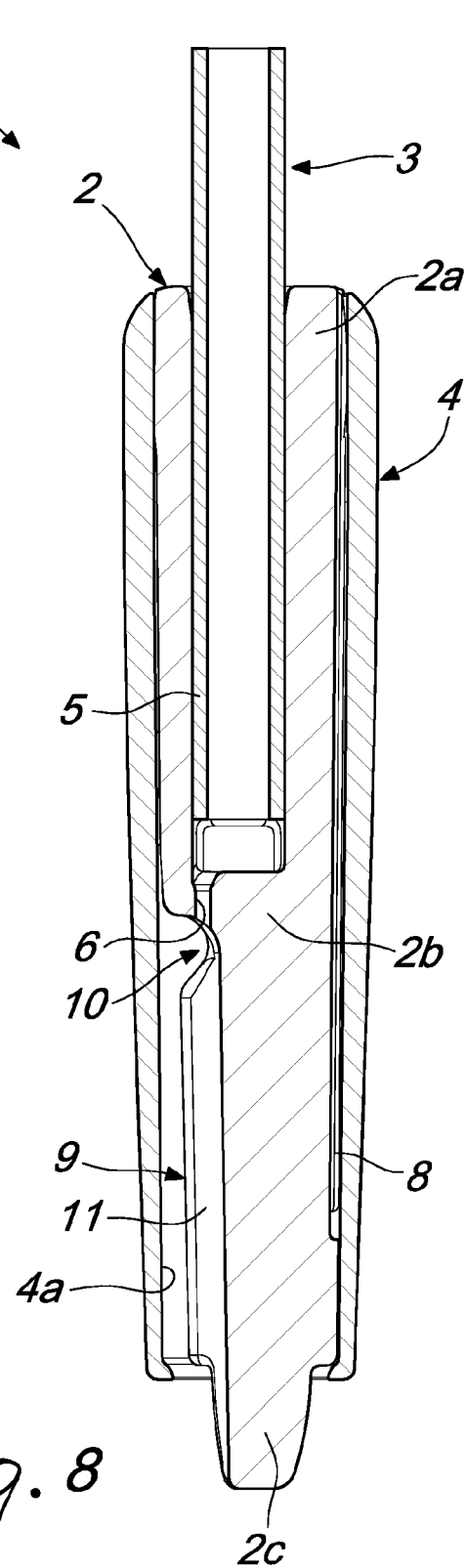

MIXING, HEATING AND/OR WHIPPING DEVICE FOR PREPARING HOT BEVERAGES

TECHNICAL FIELD

The present invention relates to a mixing, heating and/or whipping and/or frothing device for preparing hot beverages, in particular milk.

BACKGROUND ART

In machines for preparing coffee or the like it is known to froth, whip a liquid by using a jet of steam which is conveyed by means of a tube and flows out from a nozzle, to be used for preparing hot beverages such as for example the so-called "cappuccino".

Such steam jet is propelled under the free surface of the beverage to be frothed and, in order to obtain correct whipping, the operator must have high manual skills in order to obtain repeatable and quality results.

For this reason, accessories known in the jargon as "cappuccinatori" (frothers) have been devised which are designed to be coupled to a steam delivery tube, which make the whipping easier by providing inside them an organized fluid dynamics, in order to make the result independent of the user's skill. Sometimes such accessories known in the jargon as frothers, are incorrectly termed "emulsifiers", although this term does not rigorously reflect the action performed by the accessory on the beverage to be frothed.

As is known, the emulsion of a liquid entails the mixing of at least two fluids in liquid phase that are not miscible. In this particular case, the mixing of fluids in the gaseous phase (steam and air) with a fluid in the liquid phase (milk) forms froth. More precisely, the turbulence, which is generated thanks to the speed of the steam flow, makes the liquid incorporate air and, together with the heating induced by the steam, the frothing and mixing of the beverage is achieved.

In particular, it is known to use devices which, by way of a plurality of passage channels which are parallel to the steam jet, allow to aspirate air and the liquid to be whipped by making them converge in a mixing region, in which the steam jet converges as well. The channels can be separated from each other, so that each one conveys a respective flow (air, liquid or steam) in a single mixing point at the steam nozzle.

This process is allowed by the Venturi effect that is created within the device. More precisely, the steam jet travels through a main duct at high speed in order to create a partial vacuum in the ducts for aspirating the air and the liquid to be frothed, which are connected to the main duct.

In this manner, the air and the liquid to be frothed are both aspirated and conveyed into the main duct, in which the mixing of the three fluids takes place, with the consequent whipping and mixing of the beverage.

A drawback of the background art is that it is not always possible to obtain optimum froths, due to the inexperience of the user or to the ineffective mixing of air, liquid and steam.

Another drawback of frothing devices of the known type resides in that they are not easy to clean, especially inside cavities and blind spots. The need to perform cleaning operations on these types of components, especially those installed on espresso coffee machines, is in fact frequent, because during use the heating and the particular type of liquid to be whipped, i.e., milk, causes the adhesion of residues which over time become increasingly harder to remove.

Moreover, known frothing devices have a large number of components, which cause the disassembly operations that precede cleaning to be laborious.

DISCLOSURE OF THE INVENTION

The aim of the present invention is to provide a device for heating and frothing liquids, particularly milk, which is able to produce a thick and firm froth.

Within this aim, an object of the present invention is to provide a device that is constructively simple and easy to clean.

Another object of the present invention is to provide a device that is economically competitive with respect to the background art.

This aim and these and other objects that will become better apparent hereinafter are achieved by a frothing, heating and/or whipping device according to claim 1.

BRIEF DESCRIPTION OF THE DRAWINGS

Further characteristics and advantages of the invention will become better apparent from the description of a preferred but not exclusive embodiment of a frothing, heating and/or whipping device for preparing beverages, according to the invention, illustrated by way of non-limiting example in the accompanying drawings, wherein:

FIG. 1 is a perspective view of a frothing, heating and/or whipping device for preparing hot beverages according to one embodiment of the invention;

FIG. 2 is an exploded perspective view of the device shown in FIG. 1;

FIG. 7 is an enlarged-scale view of a detail of the device shown in FIG. 4;

FIG. 8 is a sectional view of the device shown in FIG. 1, taken along a longitudinal plane which is perpendicular to the sectional plane of FIG. 4.

WAYS OF CARRYING OUT THE INVENTION

Figure 3:
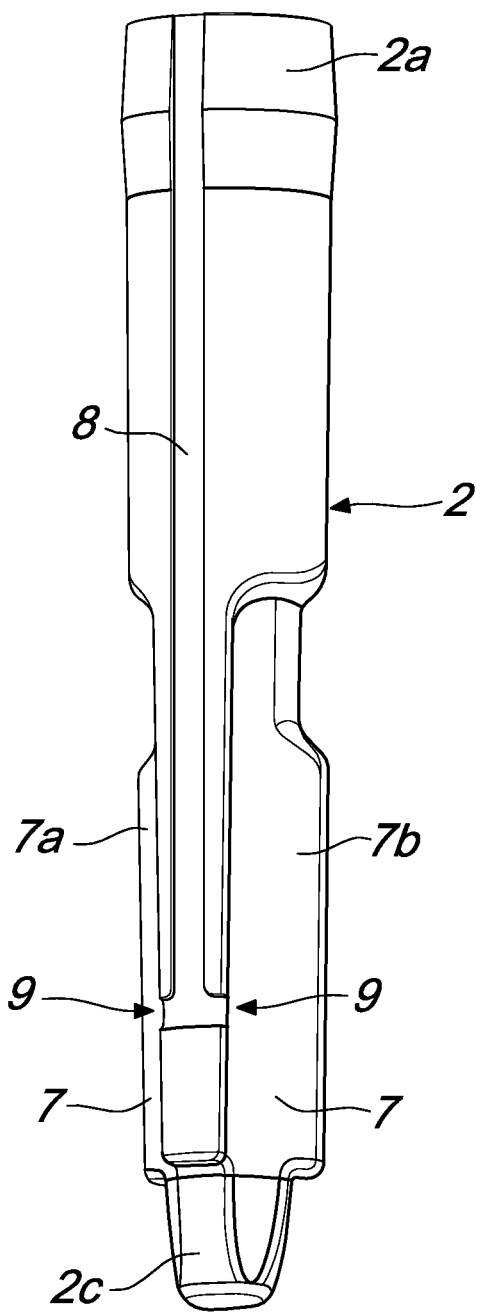
FIG. 3 is a perspective view of the central body of the device shown in FIG. 1.

With reference to the figures, the frothing, heating and/or whipping device for preparing hot beverages, also referenced hereinafter as frother, is generally designated by the reference numeral 1 and comprises a central body 2 detachably associated with a steam delivery tube 3 and an outer casing 4 in which the central body is inserted.

More particularly, the outer casing 4 is a substantially tubular element, preferably made of rigid plastics, which is fitted detachably over the central body 2, which is preferably made entirely of rubber-like material. The internal surface of the casing 4 has a shape that converges slightly toward the central axis, in the direction of the flow of the steam fed by the delivery tube 3.

The mutual fixing between the central body 2 and the outer casing 4 is preferably obtained by interference, as shown in the enlarged-scale view of FIG. 7.

In this manner the hydraulic seal between the two components is provided.

In order to facilitate said assembly by interference and ensure hydraulic tightness, the central body 2 can be entirely made of rubber-like material, or at least partially at the regions that provide interference and tightness with respect to the outer casing 4.

If the central body 2 is partially made of rubber-like material, the remaining part can be made of rigid plastics by way of bi-injection or co-molding processes.

In order to further facilitate the cleaning operations, both the central body 2 and the outer casing 4 can be made of non-stick material.

A possible constructive variation of the outer casing 4, not shown in the figures, can consist for example in providing such casing as two half-shells which can be mutually assembled, in order to further increase the level of accessibility by the user during cleaning.

The central body 2 is a single longitudinally elongated contoured insert, with a tubular end portion 2a arranged at the radially wider part of the insert 2, and forms the region of detachable connection to the delivery tube 3 and to the casing 4.

Figure 4:
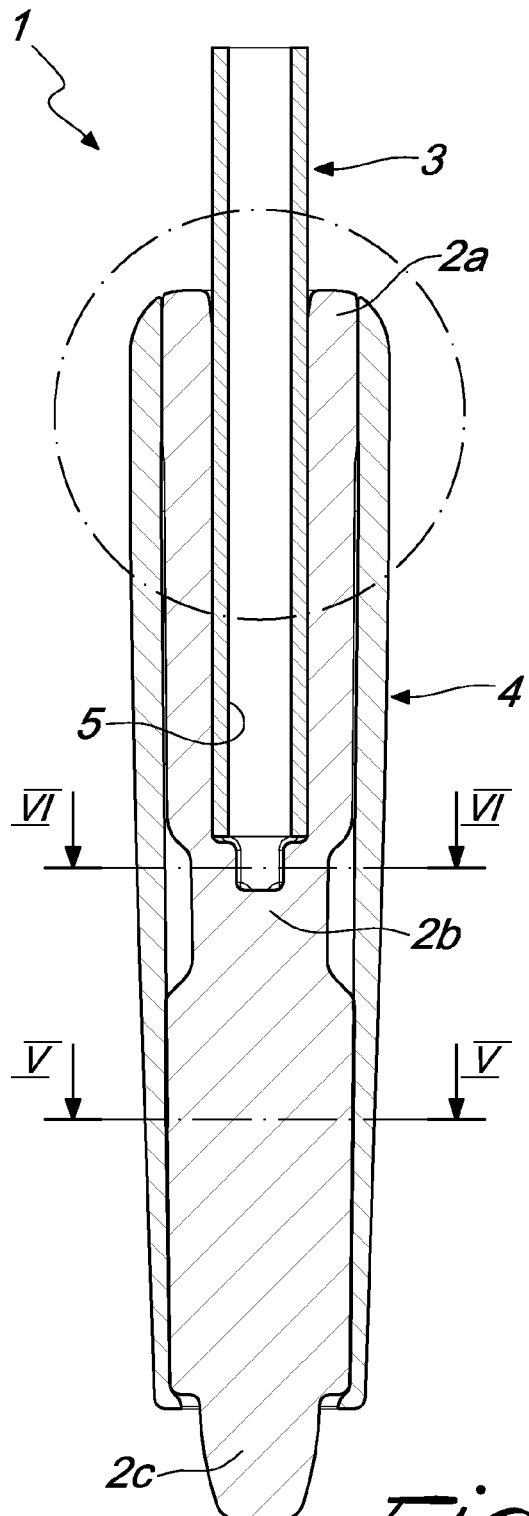
FIG. 4 is an axial sectional view of the device shown in FIG. 1.
Figure 5:
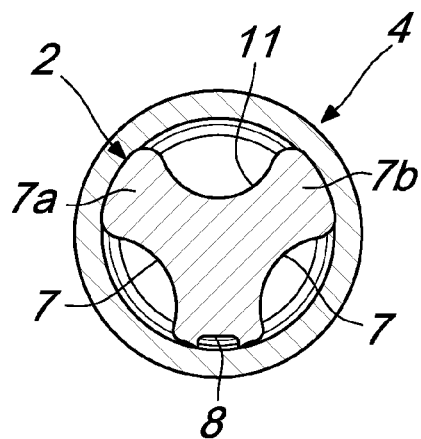
FIG. 5 is a sectional view of the device shown in FIG. 4, taken along the line V-V.
Figure 6:
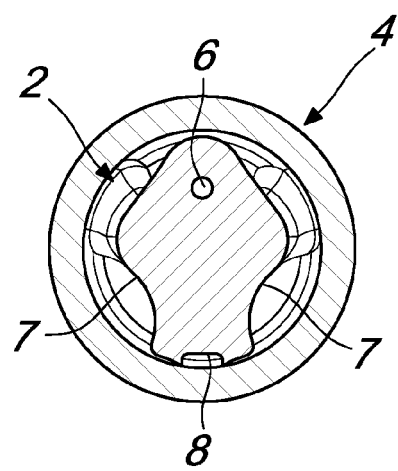
FIG. 6 is a sectional view of the device shown in FIG. 4, taken along the line VI-VI.

The delivery tube 3 can be inserted by interference in the axial cavity of the central body 2, which forms a main passage duct 5 for steam, which is shown in FIGS. 4 and 8.

The main steam duct 5 ends with a nozzle 6 which is adapted to increase the speed of the steam and to inject it into a downstream channel 11 formed between the central body 2 and the casing 4.

Moreover, the central body 2 has, downstream of the tubular portion 2a, a plurality of longitudinal grooves which are adapted to form passage channels 7 and 8 for air and for the liquid to be frothed in order to mix it with the air and the steam.

More precisely, liquid passage channels 7 are formed by the grooves between two longitudinal ribs 7a and 7b which extend along the central body 2 on the opposite side with respect to the end portion 2a and form the rising channels of the liquid to be frothed in combination with the inner surface of the casing 4.

The ribs 7a and 7b can be sized radially so as to remain in contact with the inner surface of the casing 4, so as to isolate the liquid passage channels 7 from the outflow channel of the emulsion 11. The latter is arranged downstream of the nozzle 6, in the direction of the steam, and is formed between the two ribs 7a and 7b and the inner surface of the casing 4.

Between the two liquid passage channels 7 there is an air intake channel 8, which is formed by a longitudinal groove provided along an outer surface of the central body 2 which does not belong to the ribs 7a and 7b and remains in contact with the inner surface of the casing 4. This allows to keep the air intake channel 8 separate and isolated with respect to the outflow channel of the preparation 11.

The air intake channel 8 is extended starting from the upper edge of the end portion 2a, so as to be able to be connected to the outside environment, and along much of the longitudinal extension of the central body 2, leading into both rising channels 7.

In particular, the intake channel 8 ends with a bifurcation, for example T-shaped, so as to allow connection only to the liquid passage channels 7, forming a first mixing region 9. In this first mixing region 9, during operation, a mixture is formed which is composed of the air and the liquid to be frothed which arrive by Venturi effect respectively from the intake channel 8 and from the liquid passage channels 7.

A second mixing region 10, which is separate and distinct from the first mixing region 9, is further provided proximate to the nozzle 6 and downstream of it, by means of suitable recesses on the upper part of the ribs 7a and 7b, in order to connect only the liquid passage channels 7 to the frothed liquid outflow channel 11. Preferably, the second mixing region 10 is arranged at a substantially central portion 2b of the central body 2.

In this manner, there are two different regions and, therefore, two mixing stages arranged along the device 1.

As described in greater detail hereinafter, during operation the air-liquid mixture formed in the first mixing region 9 converges in the second mixing region 10 located proximate to the nozzle 6 in order to generate the air-liquid-steam mixture as a consequence of the interaction with the steam injected into the channel 11 through the nozzle 6.

As shown in the figures, the end part 2c of the central body 2 protrudes with respect to the outer casing 4 in order to ensure circulation of the fluids, even if the device 1 is placed in contact with the walls or bottom of the vessel in which the process takes place. In this manner, the inlets and outlets are not blocked, and if the unit slips off the delivery tube 3 during the operation for cleaning the assembly, it becomes possible to push the central body 2 while holding the outer casing 4, allowing to slide off easily the central body 2 with an operation that can be performed with a single hand.

Of course, for correct operation of the device 1 part of the outer casing 4 also has to be immersed in the beverage.

In fact, if the air were allowed to enter through the rising channels 7 from the part 2c, the optimum composition of the mixture would be compromised.

Operation of the device 1 according to the present invention is directly derivable from what has been described.

In particular, it should be stressed that the steam jet that exits from the nozzle 6 is directed toward the outflow channel 11 of the preparation placed in front and creates an internal partial vacuum, which draws the liquid to be frothed from the liquid passage channels 7.

The air enters by Venturi effect from the intake channel 8 and mixes with the liquid in the first mixing region 9, reducing the local density of the mixture and helping its rise along the channels 7 for an equal partial vacuum and cross-section of the duct.

More precisely, the rising speed is determined by the result of the balance among the partial vacuum that is created, the cross-sections of the channels, the specific gravity of the liquid and its viscosity.

After transit in this first stage, the mixture arrives proximate to the nozzle 6, i.e., in the second mixing region 10. By meeting the flow of steam, the mixture is heated and whipped and is propelled toward the outflow channel 11 of the preparation, which is located downward.

In other words, the operation is composed of two separate stages, provided respectively by a mixing of the liquid and of the air in a first mixing region 9 and by a whipping of the air-liquid mixture in a second mixing region 10, in a point located proximate to the steam jet.

In practice it has been found that the frothing, heating and/or whipping device for preparing hot beverages, according to the present invention, fully achieves the intended aim and objects, since it allows to achieve the whipping of a beverage effectively, by means of an air-liquid pre-mixing which precedes the mixing with the steam, thus obtaining a froth of excellent quality.

Another advantage of the device according to the present invention consists in that the central body, being provided monolithically, can be easily disassembled from the casing with a single operation, i.e., simply by sliding off the casing.

Moreover, the central body, without the outer casing, can be cleaned with a moist cloth either by leaving it assembled on the steam delivery tube or by sliding it off such tube and cleaning it separately, even in a dishwasher. This is possible because the fluid passage channels necessary for the operation of the device are obtained mainly from the surface of the central body and become complete only when the outer casing is assembled.

A further advantage of the device according to the invention consists in that the outer casing can be cleaned internally because there are no recesses and it is completely smooth.

The frothing, heating and/or whipping device for preparing hot beverages, according to the present invention, is susceptible of numerous modifications and variations, all of which are within the scope of the appended claims.

Moreover, all the details may be replaced with other technically equivalent elements.

In practice, the materials used, so long as they are compatible with the specific use, as well as the contingent shapes and dimensions, may be any according to requirements and to the state of the art.

The disclosures in Italian Patent Application No. MI2009A000199 from which this application claims priority are incorporated herein by reference.

The invention claimed is:

1. A frothing, heating and/or whipping device for preparing hot beverages, comprising a central body detachably associable with a steam delivery tube and an outer casing which fits over said central body, said central body having a longitudinal central axis and between said central body and said casing there being at least one channel for the passage of the liquid to be frothed, an air intake channel and an outflow channel for the frothed liquid, the device comprising at least two spatially separated mixing regions, a first one of said mixing regions being provided in a meeting point between said at least one channel for the passage of the liquid to be frothed and the air intake channel, in order to form a first mixture composed of the air and the liquid to be frothed, a second one of said mixing regions being provided in a meeting point between said at least one liquid passage channel and said outflow channel for the frothed liquid, said second mixing region being arranged so as to mix said first mixture with the steam that arrives from said delivery tube, said device comprising a plurality of longitudinal grooves which extend longitudinally on said central body and which form, together with an inner surface of said outer casing fit over said central body and laterally to said longitudinal central axis of said central body, each of: said at least one channel for the passage of the liquid to be frothed; said air intake channel; and said outflow channel for the frothed liquid.

2. The device according to claim 1, wherein said central body is a substantially longitudinally elongated contoured insert, which has a substantially tubular end portion which can be connected to said delivery tube in order to form a main duct for the inflow of said steam.

3. The device according to claim 1, wherein between the passage channels for the liquid to be frothed there is located said at least one air intake channel, which extends starting from the upper edge of the end portion, so as to be able to be connected to the outside environment, and for much of the longitudinal extension of the central body, leading out into said at least one passage channel for the liquid to be frothed.

4. The device according to claim 3, comprising two of said passage channels for the liquid to be frothed, said air intake channel comprising a bifurcation for connecting to both of said passage channels for the liquid to be frothed, said outflow channel for the frothed liquid being connected, at a substantially central portion of said central body, to said two passage channels for the liquid to be frothed, a nozzle for injecting the steam that arrives from said main duct and said second mixing region being provided in the intersection between said rising channels and said outflow channel for the frothed liquid.

5. The device according to claim 1, wherein said outer casing is a substantially tubular element and is fitted detachably over said central body so that its inner surface delimits radially said passage channels for the liquid to be frothed, said outflow channel and said intake channel, said central body being fixed to said outer casing by interference.

6. The device according to claim 1, wherein said central body is entirely made of rubber material.

7. The device according to claim 1, wherein said central body is partly made of rubber material and rigid plastics by means of bi-injection or co-molding processes, said rubber material being arranged at the regions where said central body interferes and forms a seal with said outer casing.

8. The device according to claim 1, wherein said central body is made of non-stick material.

9. The device according to claim 1, wherein said central body is provided monolithically.

10. The device according to claim 1, wherein said outer casing is made of plastics or of non-stick material.

11. The device according to claim 1, wherein said central body comprises a plurality of longitudinal ribs arranged in contact with said inner surface of said outer casing so as to isolate said at least one channel for the passage of the liquid to be frothed from said outflow channel for the frothed liquid.

12. The device according to claim 11, wherein said air intake channel is formed by one of said plurality of longitudinal grooves provided along an outer surface of said central body to keep said air intake channel separate and isolated from said outflow channel for the frothed liquid.

* * * * *